United States Patent [19]
Spies et al.

[11] Patent Number: 5,617,815
[45] Date of Patent: Apr. 8, 1997

[54] REGULATING VALVE

[75] Inventors: Karl-Heinz Spies, Birkenau; Thomas Barth, Darmstadt; Wolfgang Krause, Waibstadt, all of Germany

[73] Assignee: Firma Carl Freudenberg, Weinheim, Germany

[21] Appl. No.: 433,114

[22] Filed: May 3, 1995

[30] Foreign Application Priority Data

May 6, 1994 [DE] Germany ............... 44 16 039.9

[51] Int. Cl.⁶ .................................................. F16K 11/02
[52] U.S. Cl. ................................. 123/41.1; 137/625.47
[58] Field of Search ................ 123/41.1; 236/34.5; 137/625.46, 625.47; 251/208, 317, 171

[56]         References Cited

U.S. PATENT DOCUMENTS

| 1,725,337 | 8/1929 | Burkhard ................. 137/625.47 X |
| 3,883,113 | 5/1975 | Kolb ........................ 251/317 X |
| 4,262,880 | 4/1981 | Danbo et al. ............... 251/317 X |
| 4,479,513 | 10/1984 | Koch et al. ................ 137/625.47 |
| 4,762,301 | 8/1988 | Wozniak et al. ............... 251/171 |

FOREIGN PATENT DOCUMENTS 2632476   1/1978   Germany .

*Primary Examiner*—John C. Fox
*Attorney, Agent, or Firm*—Kenyon & Kenyon

[57]            ABSTRACT

A regulating valve comprising a housing having a cylindrical valve chamber, the valve chamber being provided with at least one inlet and at least two outlets, the inlet and the outlets being at least partially closeable as needed by a common valve body arranged in the valve chamber and rotatable around an axis, the valve body being operable by an actuator, the inlet and/or at least one of the outlets being surrounded by a sealing device on the side of the housing facing the valve body and the sealing device being able to be brought into sealing engagement with the valve body under elastic preload. The valve body is designed having the shape of the segment of a cylinder and is bounded on the peripheral side by two boundary surfaces which each have an edge on the side facing the housing, the edge overtravelling the inlet during its opening being designed as an efflux edge and having an elliptically shaped recess extending in axial direction. Configured in the valve body is a duct-shaped opening which extends between the boundary surfaces and penetrates them.

1 Claim, 7 Drawing Sheets

REGULATING VALVE

BACKGROUND OF THE INVENTION

The invention relates to a regulating valve of the type comprising a housing with a cylindrical valve chamber that has at least one inlet and at least two outlets. The inlet and the outlets of this type of valve can be at least partially closed as needed by a common valve body arranged in the valve chamber and rotatable around an axis. The valve body is designed as a rotary valve and is operable by an actuator. The inlet and/or at least one of the outlets is surrounded by a seal which can be brought into sealing engagement with the valve body under elastic preload.

Such a regulating valve is known from German Patent Application 26 32 476. The regulating valve in that patent application is designed as a valve for controlling flow and is used in a mixing faucet for mixing cold and hot water. Both the inlets and the outlets are arranged diametrically opposite one another, respectively, the inlets and the outlets being arranged at right angles to one other.

In that device, the actuating forces required to move the valve body to open the inlets, through the strong acceleration of the flow at the efflux edge of the valve body, are considerable, since the suction effects arising upon opening act upon the valve body in a manner that cause it to want to close. To overcome the suction forces, the actuator for that device should be designed to be correspondingly strong, which is a disadvantage economically and with regard to the compact dimensions of the valve.

SUMMARY OF THE INVENTION

An object of the invention is to develop further a regulating valve in such a way that the starting torque necessary to open the regulating valve is substantially reduced, that a more consistent opening characteristic of the valve is obtained, and that the actuator can be designed to be more economical and compact.

Within the framework of the present invention, the valve body may be designed having the shape of a segment of a cylinder. The peripheral sides of the segment constitute two boundary surfaces, each of which has an edge on the side facing the housing (i.e., on the side of the boundary surface farthest from the axis of rotation of the valve body). The edge overtravelling the inlet during its opening is designed as an efflux edge and has an elliptically shaped recess extending in the axial direction. A duct-shaped opening is configured in the valve body and extends from one boundary surface to the other.

With such a configuration, upon opening the inlet, a sudden strong acceleration of the flow is avoided at the efflux edge of the valve body, and, because of this, suction forces which act upon the valve body in a manner that cause it to want to close are kept low. The static pressure which acts on the valve body remains nearly constant during the opening of the inlet, so that more uniform opening characteristics are achieved, beginning with the opening of the inlet up to the clearing of the entire opening cross-section.

The elliptical shape of the recess is particularly advantageous in that at first only a very small passage cross-section is released past the valve body and, because of this, the actuating force during the opening process up until the entire cross-section of the inlet is released remains constant to a large extent. These advantageous operating characteristics are advanced by the configuration of the duct-shaped opening within the valve body. The starting torque necessary to open the regulating valve is further reduced by the duct-shaped opening. It turns out that the adjusting torque needed to adjust the valve body reaches a maximum when the inlet is about half open. The duct-shaped opening causes the flow through the valve with reference to the axis of the valve body, which forms the rotational center point, to be substantially symmetrical. Therefore, the resulting torque on the valve body is markedly reduced. Because of this, the regulating valve is particularly suited for applications of high volumetric flow accompanied by low actuating forces of the valve body.

The elliptical recess can be configured such that it is extends adjacent to, but spaced from, the top and bottom sides which comprise the axial boundaries of the valve body. In this manner an excellent guidance of the valve body in the housing, in particular near the efflux edge which is provided with the elliptical recess, is assured. Appearances of canting of the valve body in the housing are reliably avoided by this configuration.

The valve body can be actuated by an electrically operated stepping motor, the stepping motor preferably being linked in a signal-conductive manner with an electronic regulating device. Depending upon preselected parameters which are stored, for instance, in the form of a characteristic in the regulating device, the passage cross-sections through the inlet and/or outlet can be adjusted. For example, a regulating valve according to the invention can be arranged in liquid circulation circuits to connect various interconnected partial areas of the circulation circuit. The actuation of the valve body with an electrically operated stepping motor is particularly advantageous for such applications, since a very exact regulation of the liquid distribution within the circulation circuit can be carried out depending upon the characteristic data in the regulating device.

Actuation of the valve body is likewise possible by means of electromagnetically, pneumatically or hydraulically operated actuator elements. For example, a particularly simple and economically cost-effective actuation of the valve body can be carried out by means of an element made of expansion material, the valve body, depending upon the temperature with which the expansion material element is acted upon, releasing the passage cross-section through the inlet and/or the outlets. For instance, the actuation of the valve body can then be regulated by the temperature of the flowing medium.

The inlet and the outlets are capable of being brought into sealing engagement with the valve body, which is rotatable around its axis, by sealing devices, the sealing devices having to seal both statically and dynamically. With frequent actuation of the valve body, durable seals which exhibit only slight wear over the entire operating life are advantageous. To achieve excellent sealing results over the entire operating life, the seals can be formed by ring-shaped premolded seals made of PTFE and can be supported on the side facing away from the valve body in an elastically flexible manner on a spring element in the axial direction of the premolded seal. In doing this, it is an advantage that, in spite of a good sealing of the inlet and/or the outlets against the relatively rotatable valve body, excellent smooth relative mobility is retained. Because of the elastic flexibility in the axial direction of the premolded seal, the premolded seal made of PTFE is sealingly engaged with the valve body and optimally allocated to it even when, subject to manufacturing and/or assembly, the housing and valve body are not absolutely exactly concentrically aligned.

The spring element can be formed, for example, by an O-ring made of elastomeric material. O-rings are parts which are economically available in nearly all desired dimensions. A regulating valve according to the invention can be constructed with a comparatively low weight and can be economically produced in large quantities. The housing can have, for example, one inlet and three outlets, such an embodiment being particularly useful when the regulating valve is used in cooling systems of combustion engines.

The duct-shaped opening through the valve body can have an essentially circular cross-section and can extend in an essentially curved manner around the axis. In view of the desirability of having a mass inertia which is as low as possible and an actuation of the valve body by starting torque which is as low as possible, the valve body may consist of a light metal alloy. An essentially circular cross-section, extending in a curved manner around the axis of the valve body and being smooth and continuous without abrupt changes in direction, allows exceptionally effective flow. By the avoidance of turbulence within the opening, cavitation is avoided. Thus the regulating valve exhibits uniformly good operating characteristics during its entire service life.

A regulating valve according to the invention may be used, for example, in a liquid cooling system of a combustion engine. The inlet may be connected with the coolant outlet of the combustion engine, with the outlets connected to the radiator circulation circuit, the bypass circulation circuit and the circulation circuit for the heating of the vehicle passenger compartment. The outlet to the radiator circulation circuit on the one side and the outlet to the passenger compartment heating circulation circuit on the other side are adjacent to the inlet in the circumferential direction of the valve chamber. The inlet and the outlets for the radiator and passenger compartment heating may be completely closed simultaneously, with the outlet of the bypass circulation circuit only completely closed by the valve body when the inlet and the outlets adjacent on both sides in the circumferential direction are completely open.

Instead of the heating circulation circuit, in the case of corresponding cooling systems the oil/water heat exchanger can be connected. By the use of a regulating valve according to the invention, a liquid cooling system design for combustion engines using particularly few parts is possible. A regulating valve is simply used in order to control all the circulation circuits of the cooling system depending upon, for example, the component temperature of the cylinder head and/or the coolant temperature. The passage cross-section through the inlet into the valve chamber and through the outlets out of the valve chamber into the adjacent circulation circuits can be adjusted easily to the respective conditions of the application by the continuously operable valve body.

When the regulating valve is used in the liquid cooling system of a combustion engine, it has proven to be advantageous to allocate a resetting spring to the valve body which, for example, in the event of the loss of actuation, brings the valve body into a position in which the associated engine suffers no damage. For instance, such a position is set in when the valve body completely releases the inlet into the valve chamber and the outlet to the radiator and to the vehicle passenger compartment heating and completely closes the bypass circulation circuit. An overheating of the associated engine is then reliably prevented.

By the integration of the heating circulation circuit into the regulating valve, it is possible to prevent circulation of the coolant in the warm-up phase, since during the warm-up phase no circulation of the coolant takes place through the vehicle passenger compartment heating circulation circuit. For example, the actuation of the regulating valve can be effected by an electrically driven stepping motor which is linked in a signal-conductive manner to the electronic valve timing of a combustion engine. Depending upon parameters which are stored for the electronic valve timing, the coolant temperature during the operation of the combustion engine can be adjusted by way of the volumetric flow through the cooling system. In this manner, it is possible to reduce fuel consumption and emissions. Also, a component temperature control, for instance a temperature control of the cylinder head, is possible.

DETAILED DESCRIPTION OF DRAWINGS

Figure 1:
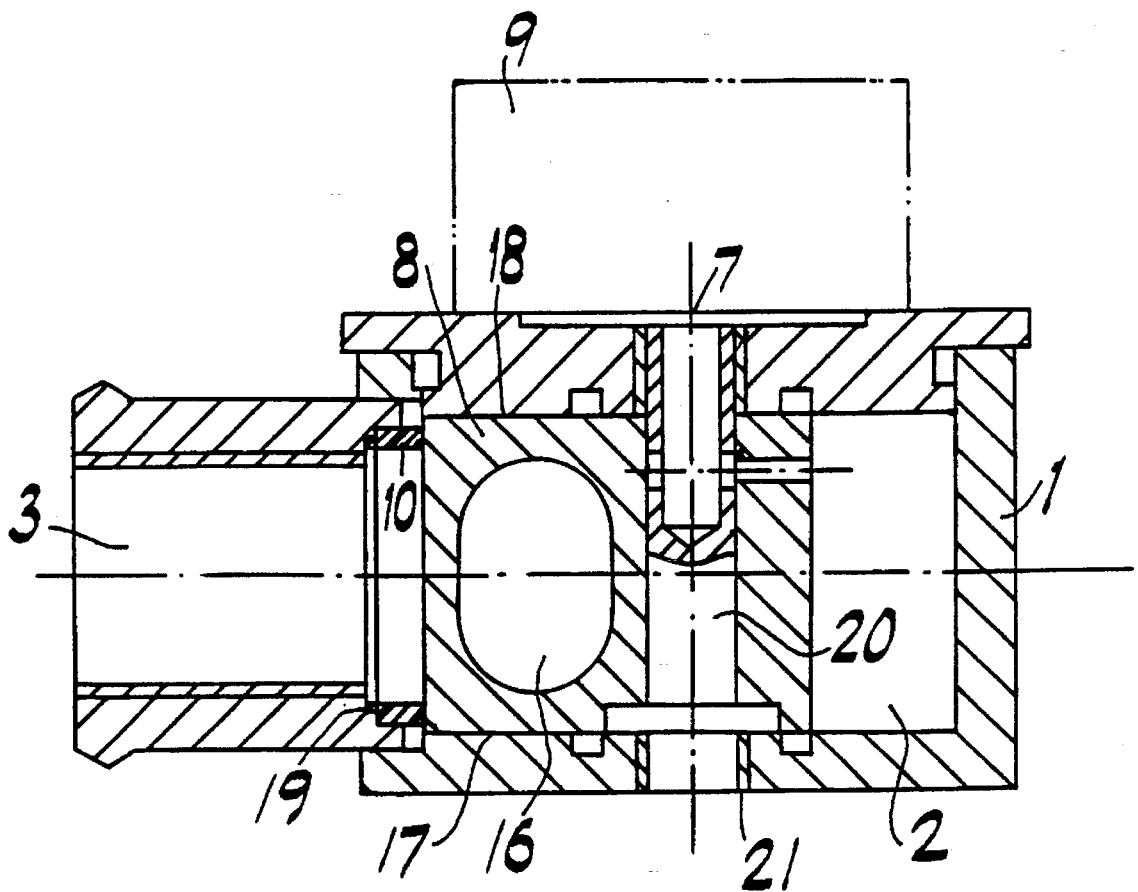
FIG. 1 shows a longitudinal section through an exemplary embodiment of a regulating valve according to the invention.

In FIG. 1, an embodiment of a regulating valve according to the invention is shown, which is used for regulating the flow of coolant through the liquid cooling system of a combustion engine. The regulating valve comprises essentially a hollow cylindrical housing 1, which encloses a valve chamber 2, with a valve body 8 being arranged inside the valve chamber 2. The valve body 8 is connected to a drive axle 20 and is rotatable around the axis 7 by an actuator 9, shown schematically in FIG. 1.

The valve chamber 2 is sealed with respect to the surroundings and the valve body 8. The connections to the housing 1, which are formed by the inlet 3 and three outlets not pictured in FIG. 1, are designed as pipe sockets which are joined to the housing 1 in a liquid-tight manner. The sealing of the pipe sockets with respect to the valve body 8 is effected on the side facing the valve body 8 by a sealing device 10, which is manufactured as a premolded part from PTFE, the sealing device 10 being supported in an elastically flexible manner in axial direction of the pipe socket on a spring element 19 designed as an O-ring. (The sealing device 10 and the compressed spring element 19 in the form of an O-ring are shown more clearly in the enlarged view A in FIG. 2)

The guidance of the drive axle 20 within the housing 1 takes place in sliding sleeves 21 in order to ensure a relative mobility of the valve body 8 in relation to the housing 1 that is as low-friction as possible. A duct-shaped opening 16 is provided within the valve body 8. In this embodiment the duct-shaped opening 16 has an oval cross-section.

Figure 2:
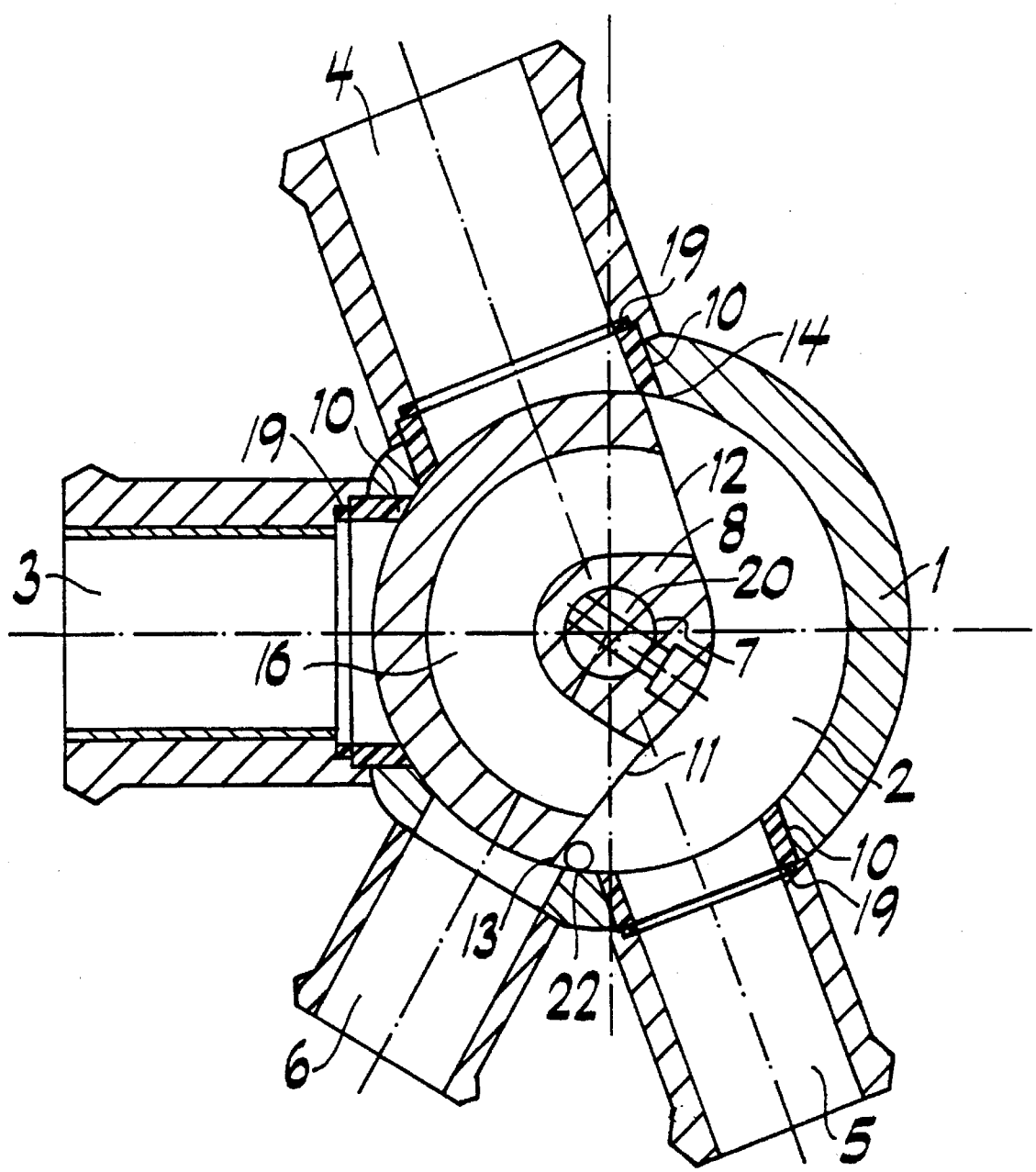
FIGS. 2 shows a cross-sectional representation of the regulating valve of FIG. 1 in a first setting of the valve body.

In FIG. 2, the regulating valve shown in FIG. 1 is shown in cross-sectional representation. The regulating valve is provided with an inlet 3 which in this embodiment is connected with the coolant outlet of a combustion engine (not shown). The outlets 4, 5 and 6 connect the valve chamber 2 to the radiator circulation circuit, the bypass circulation circuit and the vehicle passenger compartment heating circulation circuit of the cooling system, respectively. A limit stop 22 is provided as a rotation boundary of the valve body 8. Because of the elastic flexibility of the spring elements 19 (designed as O-rings), the sealing devices 10 consisting of PTFE of the inlet 3 and the outlet 4 are sealingly engaged with the surface of the valve body 8 under elastic preload. The operating state pictured here, in which the inlet 3 is blocked, causes a short warm-up phase and a quick warming of the combustion engine after the cold start. A circulation of the coolant through the cooling system of the combustion engine does not take place. It can be seen that the duct-shaped opening 16 extends in an essentially curved manner around the axis 7 of the valve body 8 and penetrates the boundary surfaces comprised of the two peripheral sides 11, 12.

Figure 3:
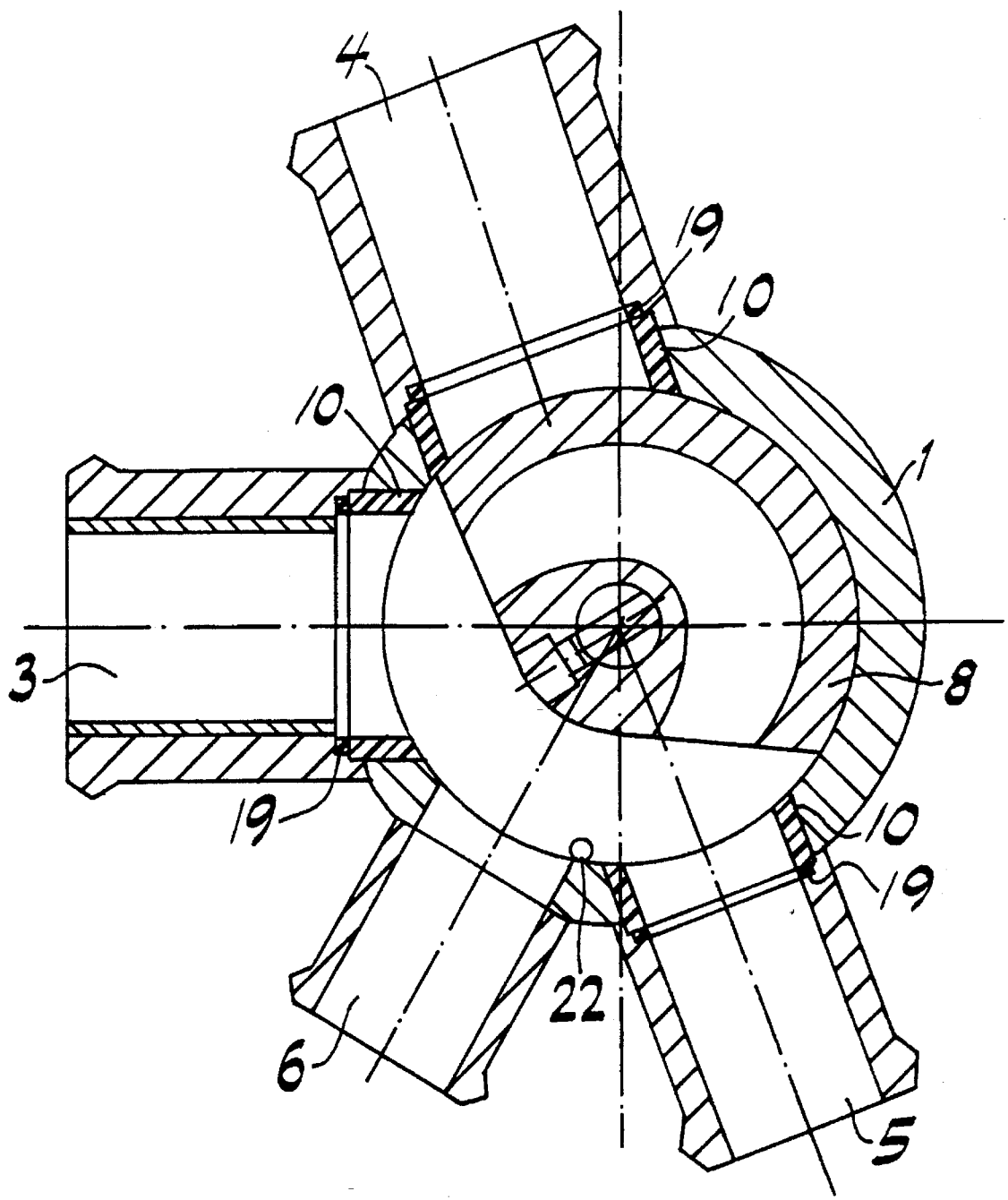
FIG. 3 shows a cross-sectional representation of the regulating valve of FIG. 1 in a second setting of the valve body.

In FIG. 3, the regulating valve is shown in an operating state different from FIG. 2. With increasing heating of the coolant and/or the components of the engine, the valve body 8 moves clockwise from the limit stop 22 in a direction which opens the inlet 3, until the entire opening cross-section of the inlet 3 is clear. The geometry of the valve body 8 and the arrangement of the inlet 3 relative to the outlets 4, 5, 6 brings about the result that, with the completely open inlet, the outlet 5 to the bypass circulation circuit and the outlet 6 to the heating circulation circuit are also completely open. The outlet 4 is still closed in the direction of the radiator circulation circuit by the valve body 8 in order to continue to achieve a quick warming of the engine to the optimum operating temperature.

The configuration of the valve body 8 is of an importance to be emphasized. Starting from the operating state of the regulating valve represented in FIG. 2, the valve body 8 in FIG. 3 is rotated relative to the housing and causes a gradual opening of the inlet 3. In order upon opening the inlet 3 to prevent a sudden enlargement of the cross-section and an abrupt acceleration of the flow and because of this a decrease of the static pressure, and to keep the starting torque for actuating the valve body 8 as low as possible, the efflux edge 13 is provided with an elliptical recess 15 (see FIG. 6) and the duct-shaped opening 16. With this construction, suction effects which cause a moment of rotation on the valve body 8 contrary to the opening direction are reduced when opening the inlet 3. Besides a more uniform opening characteristic of the valve accompanied by comparatively low actuating forces by the actuator 9, the opening 16 brings about an additional reduction of the starting torque needed because the flow relative to the turning center point of the valve body 8 is substantially symmetrical.

Figure 4:
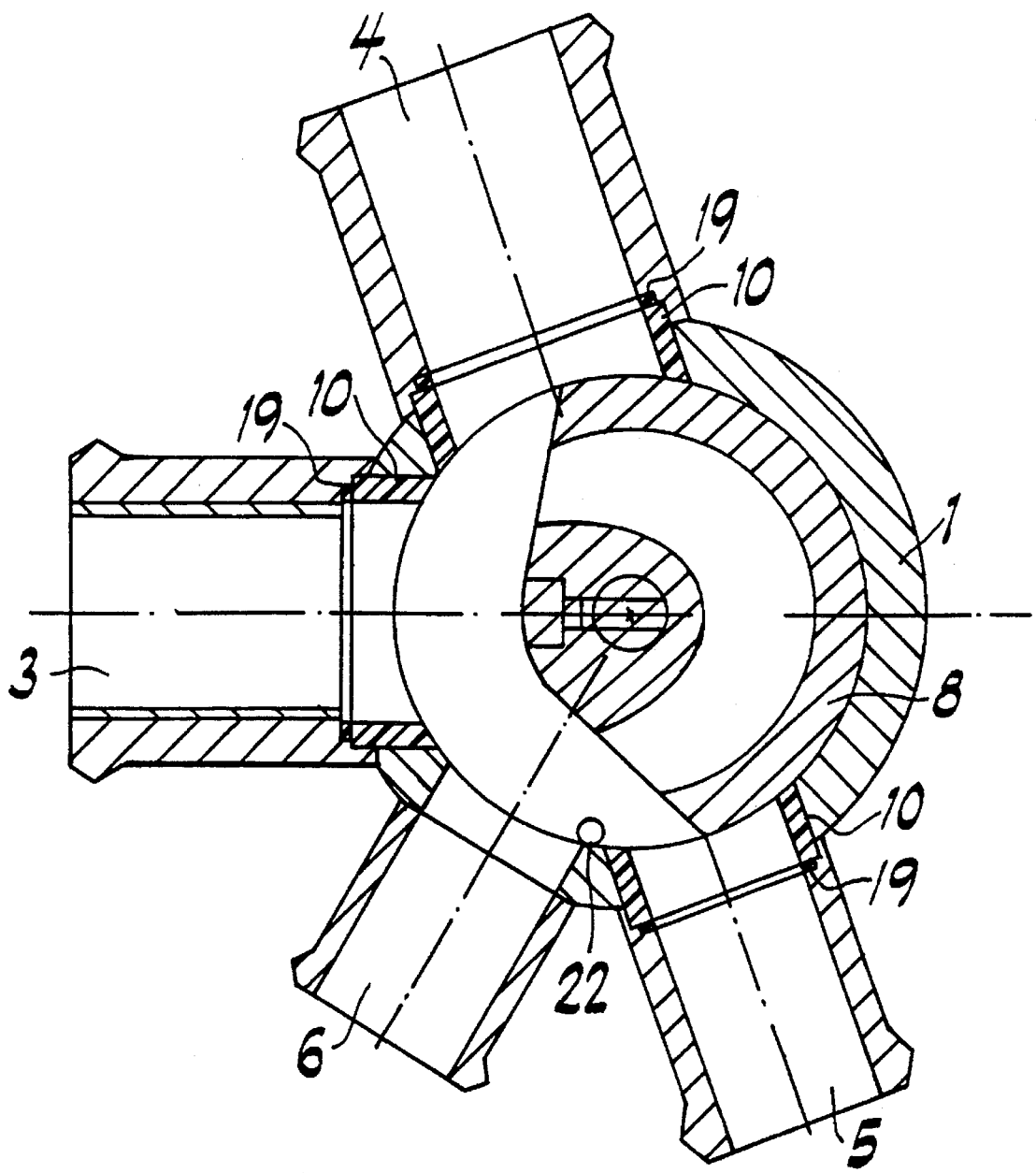
FIG. 4 shows a cross-sectional representation of the regulating valve of FIG. 1 in a third setting of the valve body.

In FIG. 4, the temperature of the coolant and/or the temperature of the components arranged within the combustion engine has further increased and the valve body 8 is moved further in the clockwise direction by the actuator 9 until the edge 13 which forms the efflux edge frees a section of the cross-section of the outlet 4 and the edge 14 opposite in circumferential direction closes a section of the outlet 5 to the bypass circulation circuit. A part of the coolant circulating in the cooling system reaches the radiator through the outlet 4 and is subsequently fed again, cooled, to the combustion engine.

Figure 5:
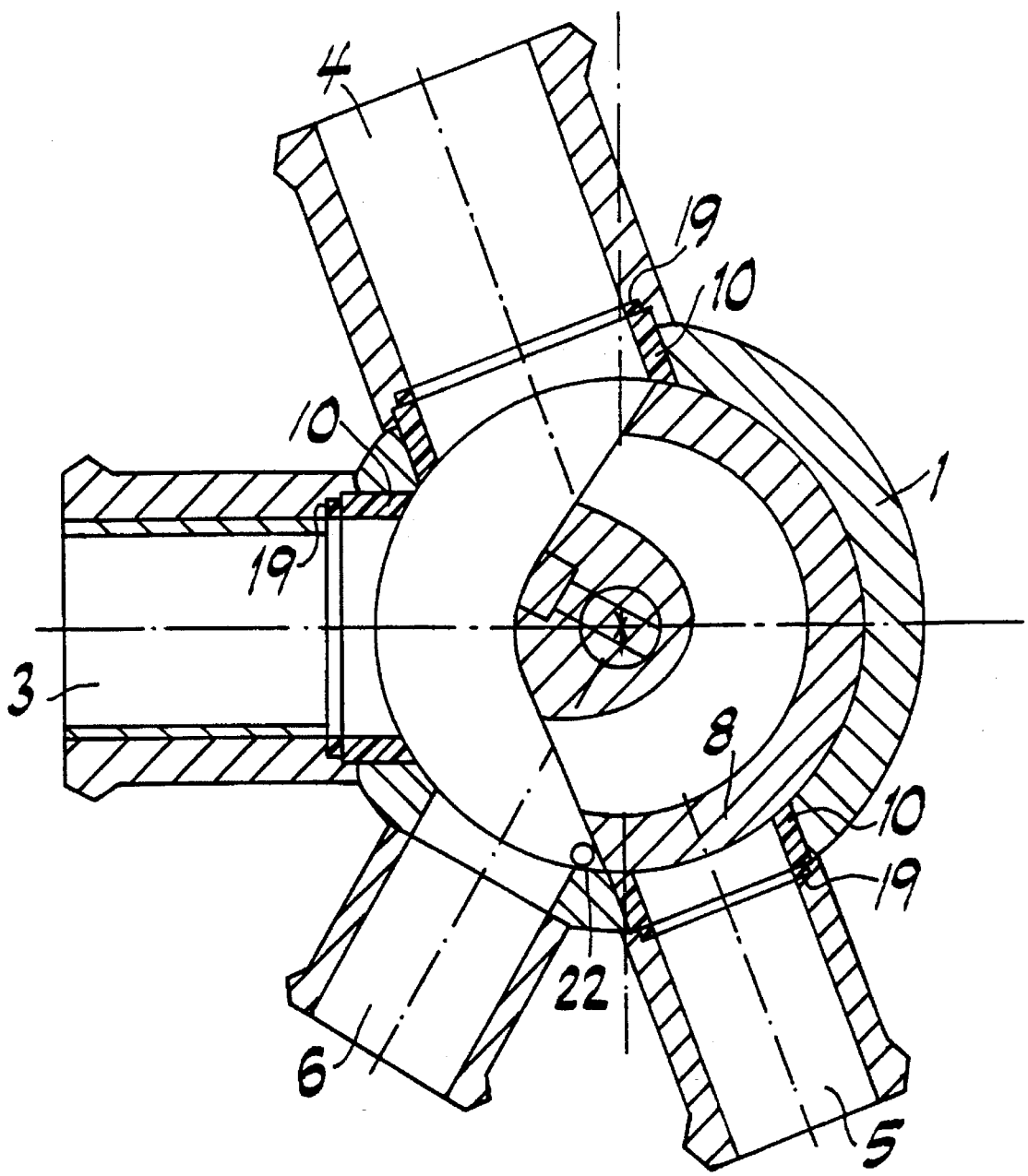
FIG. 5 shows a cross-sectional representation of the regulating valve of FIG. 1 in a fourth setting of the valve body.

In FIG. 5, an operating state of the regulating valve is shown which occurs, for instance, when the combustion engine is operated at full load and the maximum cooling performance is required. The edge 14 of the valve body 8 is engaged with the limit stop 22, and the valve body 8 completely and sealingly covers the outlet 5 of the bypass circulation circuit. In order to achieve maximum cooling performance, the outlet 4 to the radiator is completely open. In this operating state, the coolant supplied through the inlet 3 into the regulating valve 1 is distributed proportionally to the vehicle passenger compartment heating circulation circuit and the radiator circulation circuit. The valve body 8 according to the invention turns out to be especially advantageous when a high volumetric flow, pumped through the cooling system, is necessary to cool the combustion engine. The elliptical recess 15, in conjunction with the duct-shaped opening 16, causes the valve body 8 to be movable by low starting torque of the actuator 9.

Figure 6:
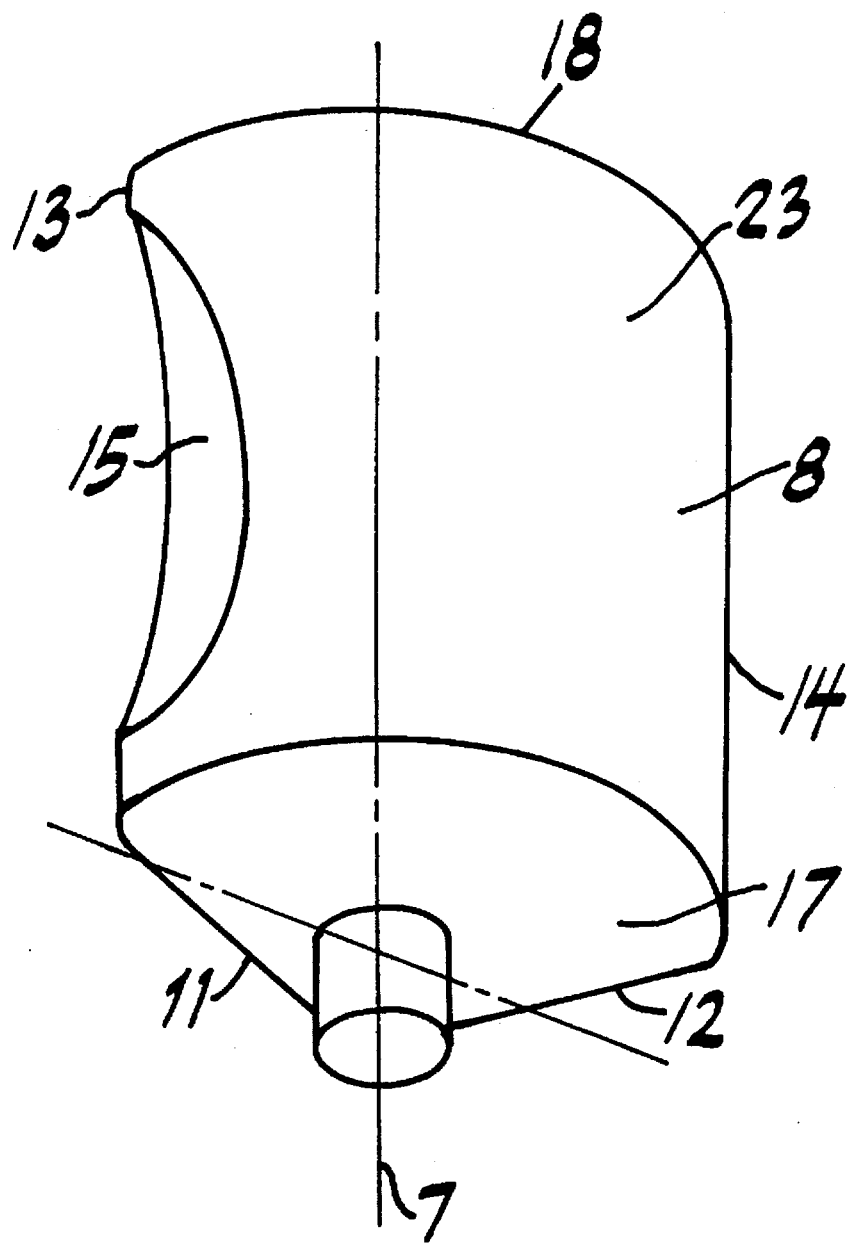
FIG. 6 shows the valve body of the regulating valve of FIG. 1, represented as a component part in a perspective view.

In FIG. 6, the valve body 8 from FIGS. 1 through 5 is shown in perspective representation. As shown in FIG. 6, the valve body 8 is shaped substantially in the form of a segment of a cylinder, having a bottom side 17 and a top side 18 comprising axial boundaries, an outer curved side 23, and two peripheral sides 11, 12 comprising boundary surfaces. Each peripheral side 11, 12 has an outside edge 13, 14 facing the housing. The outside edge 13 of the peripheral side 11, which is designed as the efflux edge, has an elliptical recess 15 which extends in the axial direction between the axial boundaries 17, 18 of the valve body 8. The opening 16 is not seen in this representation.

Figure 7:
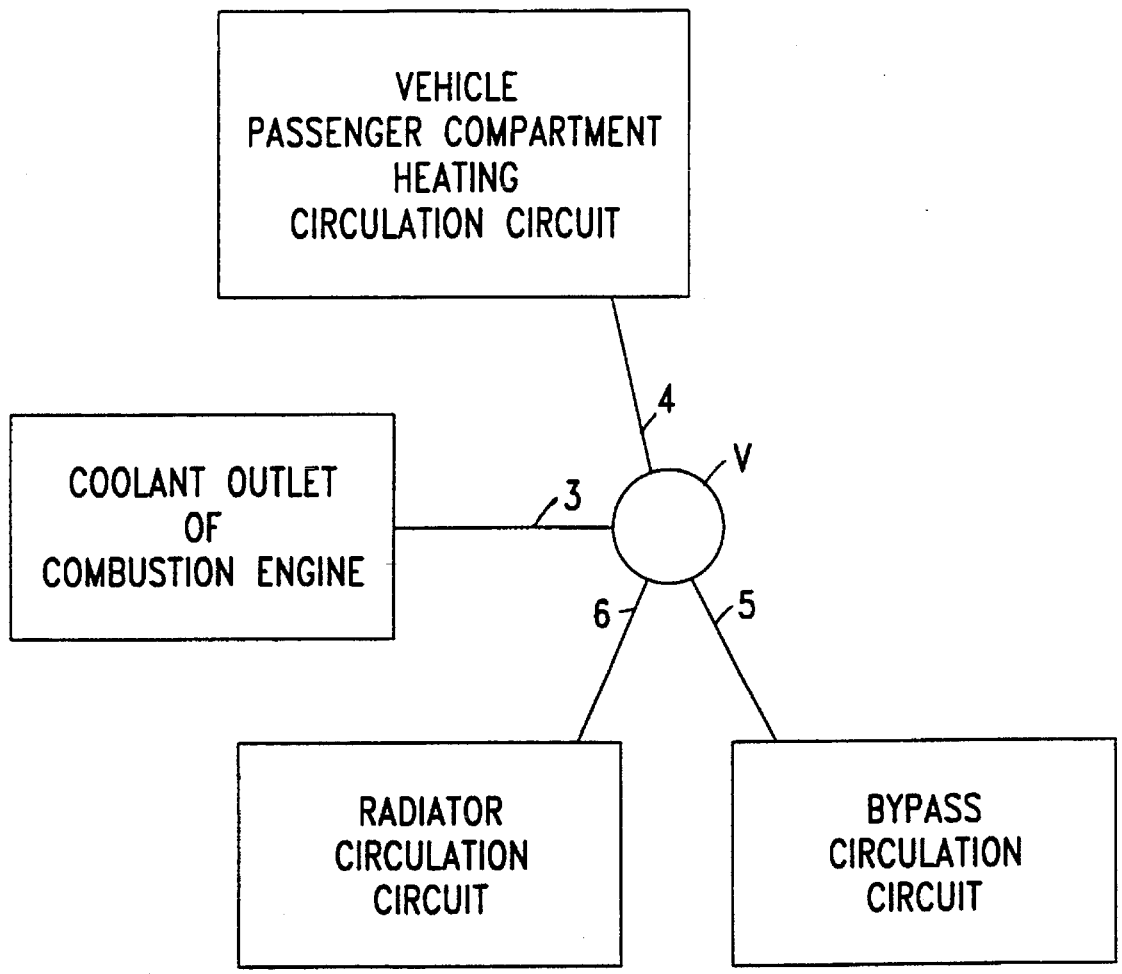

A regulating valve V according to the invention may be used, for example, in a liquid cooling system of a combustion engine, shown schematically in FIG. 7. In this embodiment, the inlet 3 of the regulating valve V is connected with the coolant outlet of the combustion engine, with the outlets 4, 5, 6 connected to the radiator circulation circuit, the bypass circulation circuit and the circulation circuit for the heating of the vehicle passenger compartment. The outlet 6 to the radiator circulation circuit on the one side and the outlet 4 to the passenger compartment heating circulation circuit on the other side are adjacent to the inlet 3 in the circumferential direction of the valve chamber. The inlet 3 and the outlets 6, 4 for the radiator and passenger compartment heating may be completely closed simultaneously, with the outlet 5 of the bypass circulation circuit only completely closed by the valve body when the inlet 3 and the outlets 6, 4 adjacent on both sides in the circumferential direction are completely open.

What is claimed is:

1. A liquid cooling-system of a combustion engine utilizing a regulating valve comprising:

a housing having a cylindrical valve chamber, the valve chamber having at least one inlet port and at least two outlet ports:

a valve body within the valve chamber and rotatable about an axis, the valve body being operable by an actuator, the valve body being rotatable to at least partially close the inlet port and the outlet ports;

a sealing device interposed between the valve body and at least one of the ports, the sealing device designed to be brought into sealing engagement with the valve body under an elastic preload;

wherein the valve body is shaped substantially in the form of a segment of a cylinder having a top side, a bottom side, an outer curved side, and two peripheral sides, wherein each peripheral side has an outside edge facing the housing;

wherein the outside edge of one of the peripheral sides passes over the inlet port during the opening of the inlet and has an elliptically shaped recess extending in a direction parallel to the axis of rotation of the valve body; and wherein a duct-shaped opening is located in the valve body, extending from one peripheral side to the other;

wherein the inlet is connected with a coolant outlet of the combustion engine, the outlets are connected with a radiator circulation circuit, a bypass circulation circuit and a circulation circuit for vehicle passenger compartment heating, wherein the outlet to the radiator circulation circuit and the outlet to the passenger compartment heating circulation circuit are adjacent to the inlet on either side, wherein the inlet and the outlets for the radiator circulation circuit and the vehicle passenger compartment heating circulation circuit are totally closable jointly and the outlet for the bypass circulation circuit is only completely closed by the valve body when the inlet and the outlets adjacent on both sides of the inlet are completely open.

\* \* \* \* \*